United States Patent
Elinav et al.

(10) Patent No.: US 9,596,679 B2
(45) Date of Patent: Mar. 14, 2017

(54) POWER DIVISION MULTIPLE ACCESS

(71) Applicant: Gilat Satellite Networks Ltd., Petah Tikva (IL)

(72) Inventors: Doron Elinav, Ramat-Gan (IL); Mati E. Rubin, Nes-Tziona (IL); Snir Brener, Petah Tikva (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

(21) Appl. No.: 15/145,142

(22) Filed: May 3, 2016

(65) Prior Publication Data

US 2016/0323856 A1    Nov. 3, 2016

Related U.S. Application Data

(63) Continuation of application No. 14/014,980, filed on Aug. 30, 2013, now Pat. No. 9,357,508.

(60) Provisional application No. 61/695,086, filed on Aug. 30, 2012.

(51) Int. Cl.
| | |
|---|---|
| *H04W 72/04* | (2009.01) |
| *H04W 52/34* | (2009.01) |
| *H04W 52/36* | (2009.01) |
| *H04B 7/185* | (2006.01) |
| *H04L 1/00* | (2006.01) |
| *H04L 5/22* | (2006.01) |

(52) U.S. Cl.
CPC ...... *H04W 72/042* (2013.01); *H04B 7/18517* (2013.01); *H04L 1/0002* (2013.01); *H04L 1/0009* (2013.01); *H04L 5/22* (2013.01); *H04W 52/346* (2013.01); *H04W 52/367* (2013.01); *H04W 72/0473* (2013.01)

(58) Field of Classification Search
CPC ............ H04B 7/18517; H04B 7/18528; H04B 7/18578; H04B 7/1851; H04W 28/085; H04W 52/30; H04W 52/246; H04W 52/241; H04W 52/245; H04W 52/146
See application file for complete search history.

(56) References Cited

U.S. PATENT DOCUMENTS

| | | |
|---|---|---|
| 5,878,329 A | 3/1999 | Mallinckrodt |
| 7,054,593 B2 | 5/2006 | de La Chapelle et al. |
| 2003/0128665 A1 | 7/2003 | Bernhard et al. |
| 2008/0247690 A1 | 10/2008 | James et al. |
| 2009/0052342 A1 | 2/2009 | Onodera et al. |
| 2010/0284325 A1 | 11/2010 | Yabo et al. |
| 2011/0013570 A1 | 1/2011 | Sherman |
| 2011/0021137 A1 | 1/2011 | Laufer |
| 2012/0188880 A1 | 7/2012 | Beeler et al. |
| 2012/0213174 A1 | 8/2012 | Manea et al. |

*Primary Examiner* — Robert M Morlan
(74) *Attorney, Agent, or Firm* — Banner & Witcoff, Ltd.

(57) ABSTRACT

A satellite communication system includes a hub and one or more terminals, wherein the one or more terminals may be configured to communicate over a satellite with the hub using a segment of the satellite's resources and using a single channel per carrier (SCPC) access scheme. Methods are presented herein for facilitating the dimensioning of at least a power characteristic of said space segment using a Demand Assignment Multiple Access approach and for enforcing the dimensioned power characteristic in real-time, or substantially in real-time. Also presented are methods for allocating power to SCPC carriers, wherein a maximum power level for a carrier may be determined using a DAMA technique.

20 Claims, 5 Drawing Sheets

POWER DIVISION MULTIPLE ACCESS

CROSS REFERENCE TO RELATED APPLICATIONS

The present application is a continuation of and claims priority to U.S. patent application Ser. No. 14/014,980, filed Aug. 30, 2013, which is a non-provisional of and claims the benefit of U.S. Provisional Patent Application No. 61/695,086, filed Aug. 30, 2012. Each of these applications is hereby incorporated by reference herein in its entirety.

FIELD OF THE INVENTION

Aspects of the disclosure pertain to the fields of satellite communication and satellite communication systems.

BACKGROUND

A satellite communication system includes a central earth station (often referred to as a hub), a plurality of other earth stations (often referred to as terminals) and a satellite. The hub and the terminals communicate over the satellite using a segment of the satellite's resources (often referred to as space segment), wherein said segment is characterized by its bandwidth and by an amount of transmission power. In order to use the space segment, the hub and the terminals use an access scheme.

In some systems, the hub transmits towards the terminals over a dedicated channel to which all terminals listen (often referred to as the forward channel), while the terminals transmit towards the hub over one or more channels (often referred to as return channel(s)). Use of the return channels is often governed by said access scheme.

Some systems use access schemes in which the terminals transmit in bursts. Such access schemes are often known as Time Division Multiple Access (TDMA) or Multi-Frequency Time Division Multiple Access (MF-TDMA). A terminal having data to transmit towards the hub either selects a channel and a time for transmitting or it is assigned (by the hub) a channel and a time for transmitting. As each physical channel can be occupied at different times by carriers emitted by different terminals, such access schemes allow multiplicity of terminals to share the return channels.

Other systems use access schemes in which the terminals transmit continuous carriers. Such access schemes are often known as Single Channel per Carrier (SCPC). Each terminal uses a dedicated channel and transmits its carrier over the channel without interruptions regardless of whether it has data to transmit or not. In such access schemes, a channel cannot be shared between terminals.

Due to allowing multiplicity of terminals to share the return channels, and due to the terminal using or being assigned capacity over the return channels only when that capacity is needed for transmitting data, MF-TDMA access schemes also allow dimensioning (also referred to as sizing) of the space segment associated with the return channels using a Demand Assignment Multiple Access (DAMA) technique. In a DAMA technique, it is assumed that only some, yet not all, of the terminals simultaneously transmit data, hence the number of return channels needed is lower than the number of terminals in the system.

In SCPC access schemes, each terminal transmits its carrier signal continuously, thus utilizing the satellite's resources (i.e. bandwidth and transmission power) at all times. Such an access scheme does not allow dimensioning of the space segment using a DAMA technique and requires the space segment to support (both in bandwidth and in transmission power) as many channels as the number of terminals in the system.

References to methods for enforcing a total power limit in a satellite communication system may be found in U.S. patent application Ser. No. 12/773,237 (US2010/0284325), entitled "Elastic Access Scheme for Two-Way Satellite Communication Systems" to Yabo et al.

References to methods for managing power in a satellite communication system may be found in U.S. patent application Ser. No. 12/920,616 (US2011/0021137), entitled "Method and Apparatus for Compensation for Weather-Based Attenuation in a Satellite Link" to Laufer.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below.

Aspects of the disclosure are directed to a satellite communication terminal, the terminal may be configured to transmit at least in accordance with an SCPC access scheme. The terminal may be further configured to modify its transmission power while transmitting an SCPC carrier signal without interrupting the SCPC carrier signal at least in accordance with a data rate characteristic. The terminal may be configured to select at least a modulation and a forward error correction (FEC) coding combination (MODCOD) associated with a lower quasi-error-free (QEF) normalized symbol energy over noise ($E_S/N_0$) characteristic in response to transmitting less data.

Aspects of the disclosure are directed to a method for operating a satellite communication system, the system comprising a hub (e.g. a central earth station) and a plurality of terminals, wherein transmissions from the terminals towards the hub may be at least in accordance with a single channel per carrier (SCPC) access scheme (SCPC links), the method comprises determining a power level that may be utilized at a satellite transponder by each SCPC link ($P_{CH}(i)$), calculating the sum of all power level figures previously determined ($P_{TOT}=\Sigma_i P_{CH}(i)$), sizing the total power that may be utilized by all SCPC links at a satellite by all SCPC links ($P_{SAT}$) to be lower than the calculated sum of all power figures previously determined ($P_{SAT}<P_{TOT}$), and enforcing in real-time, or substantially in real-time, the total power that may be utilized at a satellite transponder by all SCPC links in accordance with the sizing power figure ($P_{SAT}$).

Aspects of the disclosure are directed to methods for enforcing in real-time, or substantially in real-time, a total power that may be utilized at a satellite transponder by one or more SCPC links in accordance with a predefined power figure. In some embodiments, the predefined power figure may be a sizing (or a dimensioning) power figure associated with a space segment in which the one or more carriers (e.g. associated with the SCPC links) may be transmitted.

Aspects of the disclosure are directed to methods for allocating SCPC carriers under a predefined power-bandwidth limitation, wherein a maximum power level for each carrier may be determined using a DAMA technique.

BRIEF DESCRIPTION OF THE DRAWINGS

Figure 1:
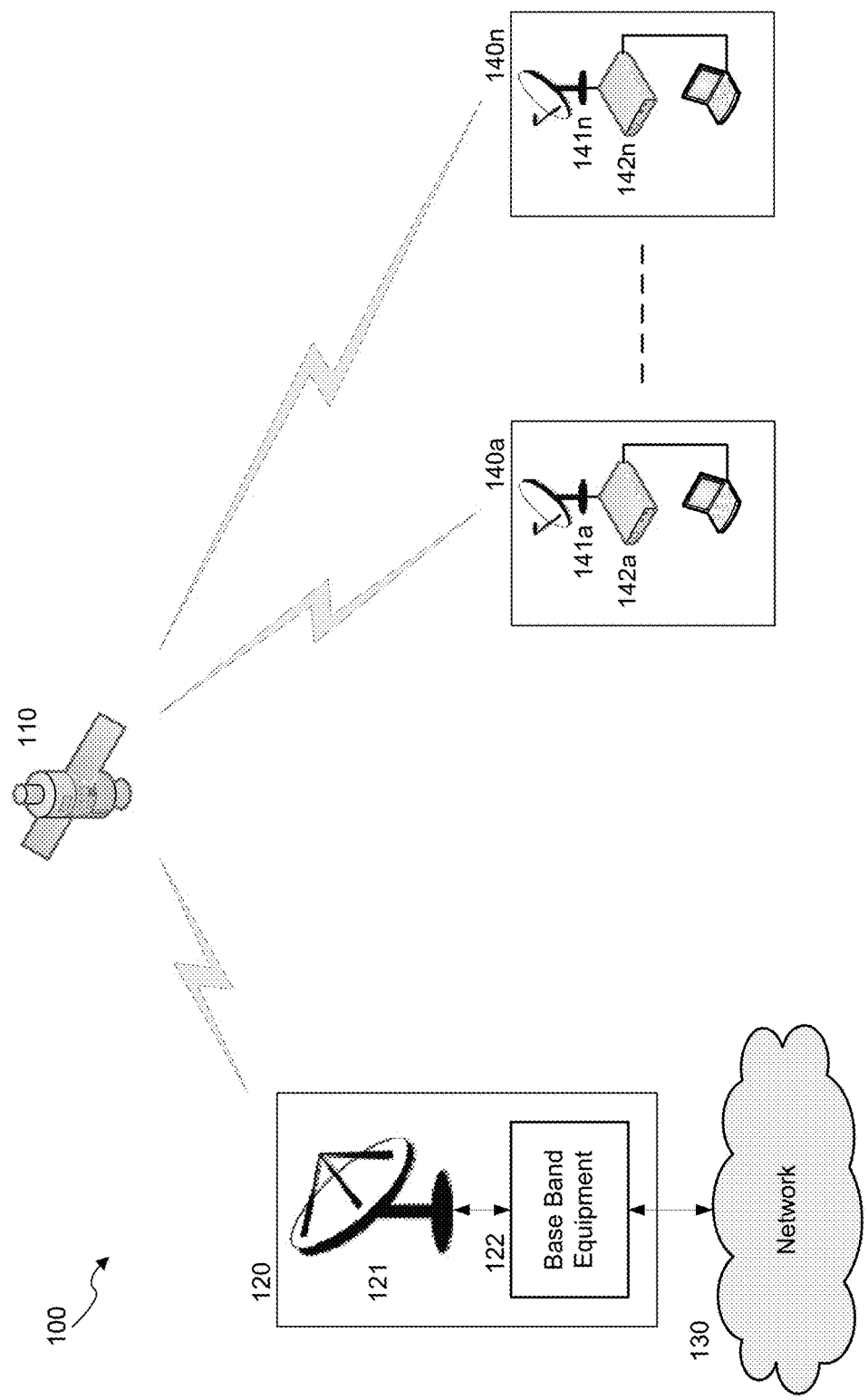

Having thus described the disclosure in general terms, reference will now be made to the accompanying drawings, which are not necessarily drawn to scale, and wherein:

FIG. 1 shows an example of a satellite communication system in accordance with aspects of the disclosure.

Figure 2:
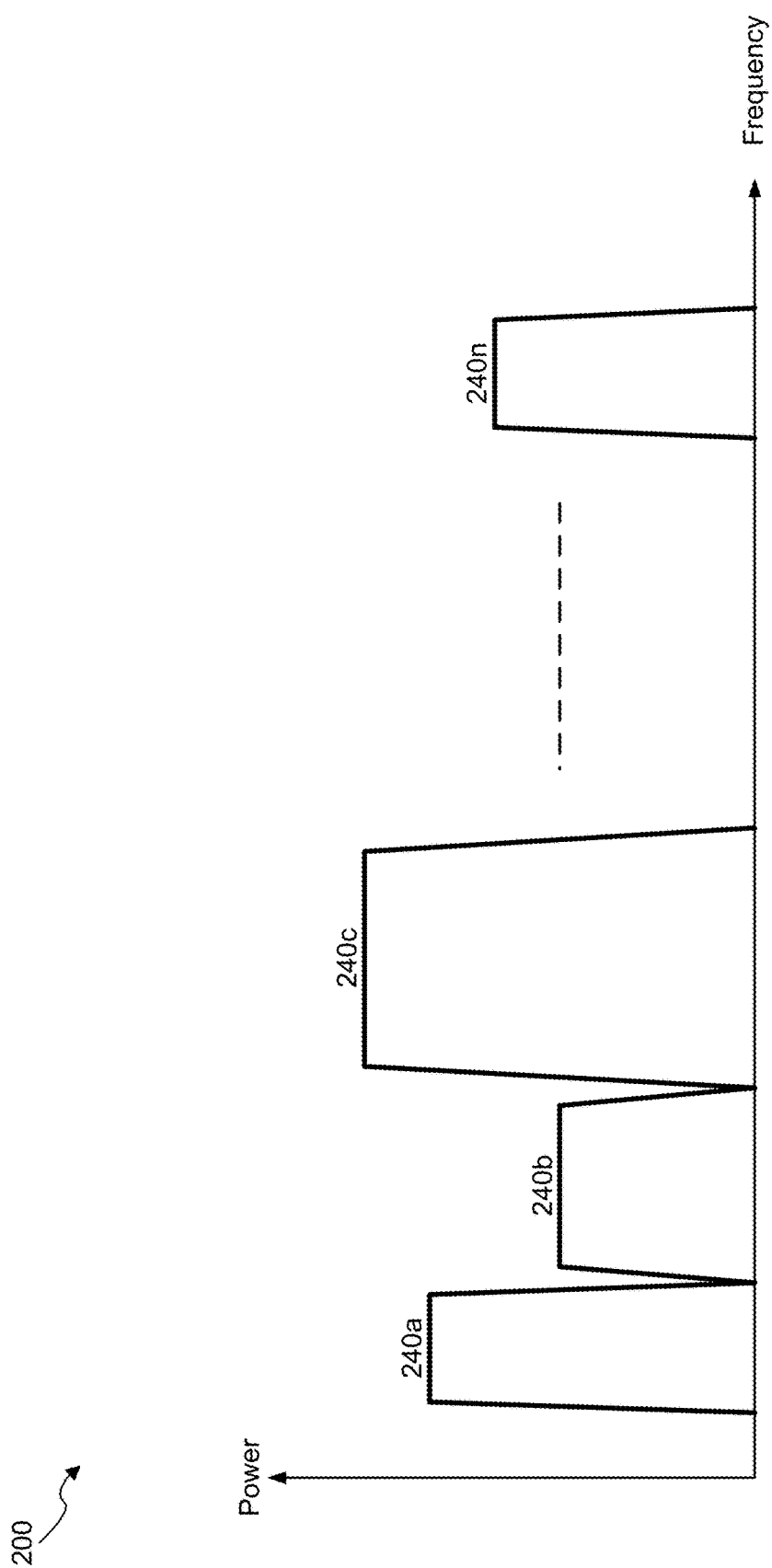

FIG. 2 shows an example of channel arrangement in accordance with aspects of the disclosure.

Figure 3:
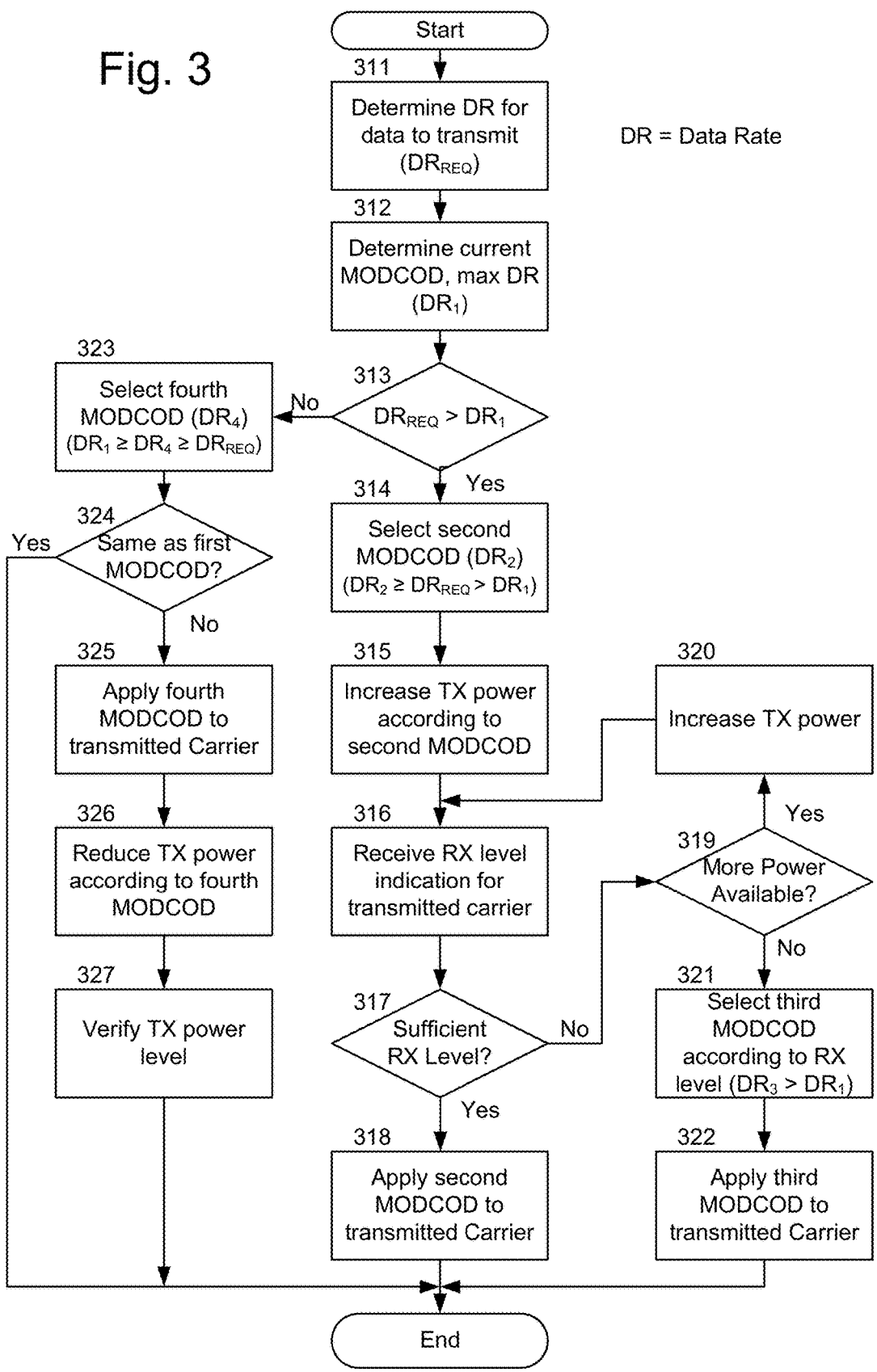

FIG. 3 shows a flow chart of an example algorithm for adjusting the transmission power of a terminal in accordance with aspects of the disclosure.

Figure 4:
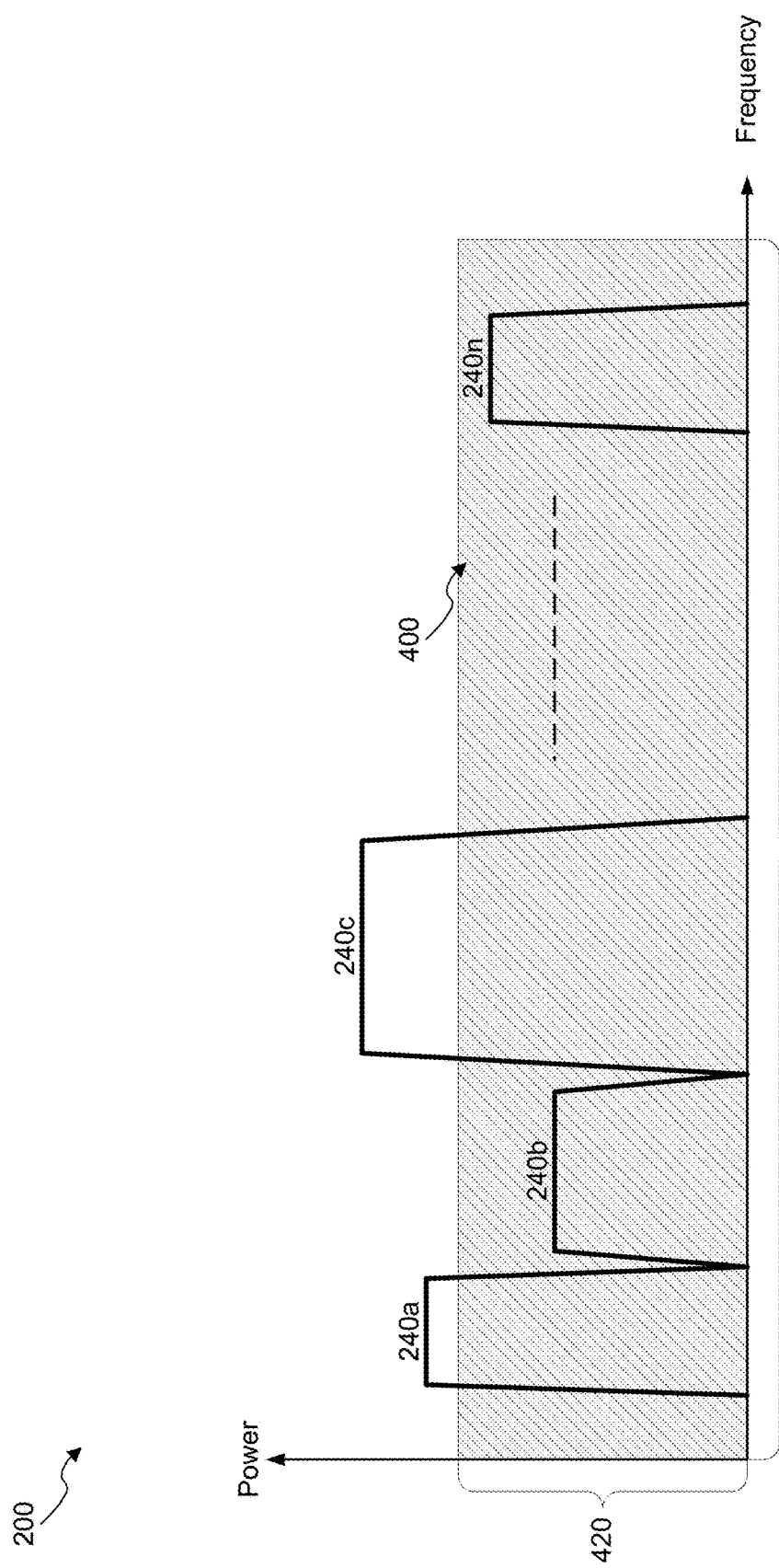

FIG. 4 shows an example of a channel arrangement and a power-bandwidth limitation in accordance with aspects of the disclosure.

Figure 5:
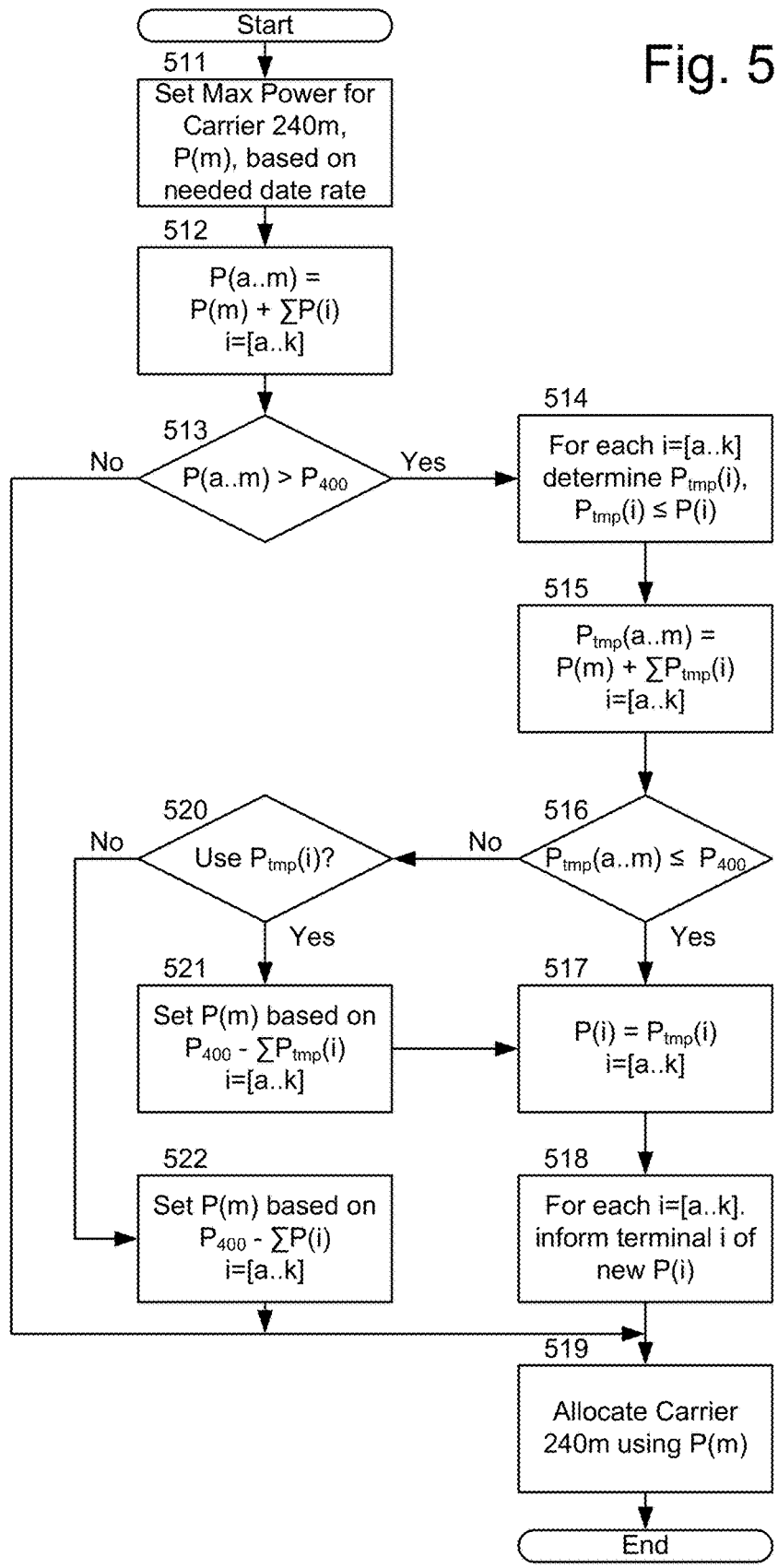

FIG. 5 shows a flow chart of an example algorithm for determining a maximum power for a carrier in accordance with aspects of the disclosure.

DETAILED DESCRIPTION

FIG. 1 shows an example of a satellite communication system 100. Satellite communication system 100 may include a hub 120 and one or more terminal(s) 140a-n. Hub 120 and terminal(s) 140a-n may be configured to communicate over satellite 110 using a segment of the satellite's resources (space segment). Satellite communication system 100 may be further configured in some exemplary embodiments to use at least a single channel per carrier (SCPC) access scheme for one or more return channels, which may be used by one or more of the one or more terminal(s) 140a-n for at least the purpose of transmitting towards hub 120. In some embodiments, satellite communication system 100 may be configured to use an MF-TDMA access scheme for a first portion of the terminals and to use SCPC access scheme for a second portion of the terminals. In some embodiments, a terminal, for example terminal 140a, may be associated with the MF-TDMA access scheme used with the first portion of terminals during some of the time and associated with the SCPC access scheme used with the second portion of the terminals at other times.

For the sake of simplicity, the description herein may refer to a terminal 140, wherein terminal 140 may be any one of the one or more terminal(s) 140a-n. This type of simplification may also extend to other described elements, where applicable.

FIG. 2 shows an example of a return channel arrangement 200 that may correspond to satellite communication system 100. A terminal 140 (e.g. 140a) may use or may be assigned a dedicated return channel for transmitting a carrier 240 (e.g. 240a respectively). In some embodiments, one or more carrier(s) 240a-n associated with the one or more terminal(s) 140a-n may be of non-uniform characteristics. For example, carriers may differ in one or more of: symbol rate, modulation, forward error correction coding (FEC), transmission power and/or power spectral density (e.g. as may be needed from satellite 110), and/or in any one or more other applicable parameter(s).

As previously described, in an SCPC access scheme a terminal 140 may transmit its carrier 240 over an assigned return channel continuously, thus utilizing the bandwidth property of the space segment at all times, or substantially at all times. However, though the bandwidth associated with a space segment may not be shared between terminal(s) 140a-n, the transmission power drawn from satellite 110 for transmitting carrier(s) 240a-n may be shared, for example, the purpose of allowing use of Demand Assignment Multiple Access (DAMA) technique(s) for dimensioning (or sizing) a power property of the space segment.

In one aspect of the disclosure, a terminal 140 may be configured to transmit at least in accordance with an SCPC access scheme and may be further configured to modify its transmission power while transmitting an SCPC carrier signal in accordance with at least a data rate characteristic, wherein said modifying of transmission power may be performed without interrupting the SCPC carrier signal.

A terminal 140 may be configured to transmit a continuous carrier at any one or more symbol rates, wherein the symbol rate characteristic of the carrier may determine the bandwidth needed for the carrier. With the symbol rate given, the data rate that terminal 140 may transmit over the carrier may correspond to at least a modulation and FEC coding combination (MODCOD) that terminal 140 may be configured to use. For example (ignoring possible inefficiencies, e.g. due to headers and other overheads), a Quad Phase Shift Keying (QPSK) modulation with a FEC rate of ¾ may allow transmitting at a data rate of about 1.5 times the symbol rate, while an 8 Phase Shift Keying (8PSK) modulation with a FEC rate of ⅔ may allow transmitting at a data rate of about 2 times the symbol rate. In addition, each MODCOD may be associated with a quasi-error-free (QEF) normalized symbol energy over noise ($E_S/N_0$) characteristic, e.g. a signal to noise level that may be needed at an input to a receiver (for example at hub 120—such receiver is not specifically shown in FIG. 1 but may be included in baseband equipment 122) for at least the purpose of receiving the transmitted data with a rate of errors not higher than said QEF threshold. For the most cases, the QEF $E_S/N_0$ levels of said MODCODs may be directly proportional, or substantially in direct proportion, to the data rate that may be transmitted over a given symbol rate using said MODCODs. For example, a QEF $E_S/N_0$ level associated with a QPSK ¾ MODCOD may be lower than a QEF $E_S/N_0$ level associated with an 8PSK ⅔ MODCOD. Consequently, terminal 140 may be configured to transmit at a higher power level when using a MODCOD supporting a higher data rate and/or to transmit at a lower power level when using a MODCOD supporting a lower data rate.

Referring to FIG. 3, terminal 140 may be configured in exemplary embodiments to determine at least a data rate characteristic ($DR_{REQ}$) for data to be transmitted (step 311). In some embodiments, terminal 140 may be configured to determine said at least data rate characteristic for data to be transmitted at preconfigured intervals. In some embodiments, terminal 140 may be configured to determine a data rate characteristic for data to be transmitted for example by counting an amount of data to be transmitted per a preconfigured time interval, or by using any other method for estimating or measuring a rate of data. In some embodiments, terminal 140 may be configured to determine a data rate by detecting one or more applications for which data may be transmitted and analyzing the data associated with said one or more applications. For example, terminal 140 may be configured to detect at least one video stream and determine a data rate characteristic associated with the at least one video stream, e.g. by analyze signaling data that may be associated with the at least one video stream or by analyzing the data of each video stream for a data rate characteristic. Terminal 140 may be further configured, upon determining (step 311) a data rate characteristic for data to be transmitted ($DR_{REQ}$), to further determine (step 312) a first MODCOD that may be used at that time for transmitting carrier 240 associated with terminal 140 and a first maximum data rate that may be transmitted over carrier 240 using said first MODCOD ($DR_1$). Terminal 140 may be further configured to then compare (step 313) the determined data rate ($DR_{REQ}$) with said determined first maximum data rate ($DR_1$). If the determined data rate is higher than said first maximum data rate ($DR_{REQ} > DR_1$), terminal 140 may be configured to select a second MODCOD (step 314) that may support a higher second maximum data rate ($DR_2$) over carrier 240 and to apply said selected second MODCOD to the transmitted carrier 240. In some embodiments, said second MODCOD may be selected to be a MODCOD associated with a maximum data rate (e.g. second maximum data rate ($DR_2$)) which is higher than or equal to the determined data rate (e.g. $DR_2 \geq DR_{REQ}$). In some embodiments, said second MODCOD may be selected to be a MODCOD associated with a minimal maximum data rate which is higher than or equal to the determined data rate.

Applying said selected second MODCOD to transmitted carrier 240 may be further comprised of several steps, which terminal 140 may be configured to perform after selecting said second MODCOD. Since said second MODCOD may support a higher maximum data rate than said first MODCOD (e.g. $DR_2 \geq DR_{REQ} > DR_1$), said second MODCOD may be associated with a higher QEF $E_S/N_0$ level than said first MODCOD. Thus, terminal 140 may be configured, upon determining said second MODCOD, to modify (e.g. increase) its transmission power in accordance with at least a QEF $E_S/N_0$ level associated with said second MODCOD (step 315), to receive reception level indications (step 316) (for example $E_S/N_0$ estimations, readings or measurements) from a receiver that receives carrier 240 (for example, such a receiver may be located at hub 120 and said reception level indication may be sent from hub 120 to terminal 140 over a forward channel), and to determine whether the transmitted carrier may be received at a sufficient $E_S/N_0$ level in accordance with at least a QEF $E_S/N_0$ level associated with said second MODCOD (step 317). Terminal 140 may be further configured, upon determining that its transmitted carrier may be received at said receiver at a sufficient $E_S/N_0$ level, to apply said second MODCOD to the transmitted carrier (step 318), e.g. to transmit carrier 240 using said second MODCOD.

Furthermore, terminal 140 may be configured, upon determining that its transmitted carrier may be received at said receiver at an insufficient $E_S/N_0$ level (step 317), to determine whether a further increase of transmission power may be possible (step 319). If further increase in transmission power may be possible, terminal 140 may be configured to increase transmission power further (step 320), to again receive reception level indications (step 316) from a receiver that receives carrier 240 and to again determine whether the transmitted carrier may be received at a sufficient $E_S/N_0$ level (step 317). However, if further increase in transmission power might not be possible (for example, due to reaching a maximum transmission power level limit that may be associated with the terminal's transmitter, or due to any other limit that may apply to a transmission power level from terminal 140), terminal 140 may be configured to at least maximize the transmitted data rate in accordance with the maximum transmission power available and/or allowed. Terminal 140 may be configured to select a third MODCOD that may support a maximum data rate (e.g. third maximum data rate ($DR_3$)) higher than said first maximum data rate (e.g. $DR_3 > DR_1$) at least in accordance with an available and/or allowed transmission power (step 321), and to apply the selected third MODCOD to the transmitted carrier 240 (step 322).

In some embodiments, terminal 140 may be further configured, upon increasing the transmission power (step 320), to select an intermediate MODCOD in accordance with the receive reception level indications and to apply said intermediate MODCOD to the transmitted carrier 240. The intermediate MODCOD may be different than both the first and the second MODCODs and it may be associated with a QEF $E_S/N_0$ level higher than the QEF $E_S/N_0$ level associated with the first MODCOD and/or lower than or equal to an $E_S/N_0$ level corresponding to the received reception level indications. A number of such intermediate MODCODs may be selected and applied during a transition from the first MODCOD to the second MODCOD, for example if transmission power is increased one or more times (step 320) before it may be determined to be sufficient for supporting the second MODCOD (step 317). Use of said intermediate MODCOD(s) may allow increasing the transmitted data rate even before the transmission power may be stabilized for supporting the selected second MODCOD.

Furthermore and again in reference to step 313, if the determined data rate is lower than or equal to said first maximum data rate (e.g. associated with the first MODCOD) ($DR_1 \geq DR_{REQ}$), terminal 140 may be configured to select a fourth MODCOD (step 323) that may support a lower maximum data rate (e.g. fourth maximum data rate ($DR_4$)) over carrier 240, wherein the maximum data rate associated with the selected fourth MODOCD may be still higher than or equal to the determined data rate (e.g. $DR_1 \geq DR_4 \geq DR_{REQ}$). In some embodiments, said fourth MODCOD may be selected to be a MODCOD associated with a minimal maximum data rate which may be higher than or equal to the determined data rate ($DR_4 \geq DR_{REQ}$). If the fourth MODCOD is the same as the first MODCOD (step 324, e.g. $DR_1 = DR_4 \geq DR_{REQ}$), terminal 140 may be configured to conclude the procedure, as no MODCOD change (and perhaps no transmission power change) may be needed. However, if the fourth MODCOD is different from the first MODCOD (e.g. $DR_1 > DR_4 \geq DR_{REQ}$), terminal 140 may be further configured to apply the selected fourth MODCOD to transmitted carrier 240.

Since said fourth MODCOD may support a lower maximum data rate than said first MODCOD (e.g. $DR_1 > DR_4$), said fourth MODCOD may be associated with a lower QEF $E_S/N_0$ level than said first MODCOD. Thus, terminal 140 may be configured, upon determining said fourth MODCOD, to apply the fourth MODCOD to the transmitted carrier 240 (step 325) prior to changing its transmission power level. Since the fourth MODCOD may be associated with a lower QEF $E_S/N_0$ level than said first MODCOD, following the application of the fourth MODCOD, carrier 240 may be transmitted at an excessive power level. Thus terminal 140 may be further configured to modify (e.g. reduce) its transmission power in accordance with at least a QEF $E_S/N_0$ level associated with said fourth MODCOD (step 326) and to verify that the carrier may be received at an appropriate reception level (step 327). For example, said verifying step may comprise receiving reception level indications (for example $E_S/N_0$ estimations, readings or measurements) from a receiver that receives carrier 240 (for example, such a receiver may be located at hub 120 and said reception level indication may be sent from hub 120 to terminal 140 over a forward channel) and adjusting the transmission power level at least in accordance with the received reception level indications and in accordance with a QEF $E_S/N_0$ level associated with said fourth MODCOD.

In some embodiments, terminal 140 may be further configured to consider an additional preconfigured spare capacity (SC) and to compare the first maximum data rate (e.g. the maximum data rate associated with the first MODCOD that may be currently used) with the total sum of the estimated data rate characteristic and the preconfigured spare capacity (e.g. $DR_{REQ}$+SC). Terminal 140 may be configured to consider said spare capacity at least for the purpose of allowing some increase in data rate to be transmitted prior to applying said second MODCOD. In some embodiments, said spare capacity may be used in order to allow increase in data rate for applications and/or protocols that may use flow control and may adapt at least a data rate characteristic to an available data rate over a transmission channel.

In another aspect of the disclosure, a method is presented for operating a satellite communication system 100 (e.g. as shown in FIG. 1), the system comprising a hub 120 and one or more terminal(s) 140a-n, wherein the one or more terminal(s) 140a-n may be configured to transmit towards the hub at least in accordance with an SCPC access scheme. In some embodiments, satellite communication system 100 may be configured to use an MF-TDMA access scheme for a first portion of the terminals and to use SCPC access scheme for a second portion of the terminals. In some embodiments, a terminal, for example terminal 140a, may be associated with the first portion of terminals during some of the time and associated with the second portion of the terminals on other times.

FIG. 4 shows an example of a return channel arrangement 200 that may correspond to satellite communication system 100, and a power-bandwidth limitation 400. The one or more terminal(s) 140a-n may use or may be assigned one or more dedicated return channel(s) for transmitting one or more carrier(s), e.g. carrier(s) 240a-n respectively. In some embodiments, the one or more carrier(s) 240a-n associated with the one or more terminal(s) 140a-n may be of non-uniform characteristics and may differ in one or more of: symbol rate, modulation, forward error correction coding (FEC), transmission power and/or power spectral density (e.g. as may be needed from satellite 110), and/or in any one or more other applicable parameter(s).

Power-bandwidth limitation 400 may be characterized by a bandwidth limitation 410 and a power limitation 420. In some embodiments, power limitation 420 may correspond to a normalized symbol energy over noise ($E_S/N_0$) characteristic of a carrier occupying the entire bandwidth limitation 410, for example as it may perhaps be measured (e.g. either theoretically or practically) at hub 120. In some embodiments, said $E_S/N_0$ characteristic may correspond to a maximum power level that may be drawn from a satellite (e.g. satellite 110) over said bandwidth limitation 410 (for example whether such limitation is a physical limitation of the satellite, a contractual limitation as per lease conditions of the space segment, or any other limitation).

For each carrier 240a-n, a maximum power limit ($P_{CH}(i)$, $1 \leq i \leq n$) may be determined during dimensioning (sizing) of return channel arrangement 200 and/or of the carrier(s) included in bandwidth limitation 410. A determined power limit ($P_{CH}(i)$, $1 \leq i \leq n$)) may be based, for example, on a QEF $E_S/N_0$ characteristic of a MODCOD corresponding to a maximum data rate that a terminal 140 may need to transmit over a corresponding carrier 240 (e.g. given the symbol rate of carrier 240). Once a maximum power limit has been determined for each carrier 240a-n, the total sum of all power limits corresponding to all carriers included in bandwidth limitation 410 may be calculated ($P_{TOT}=\Sigma_i P_{CH}(i)$). Knowing the total sum of all said power limits ($P_{TOT}$), the power needed from a satellite (e.g. satellite 110) for supporting the one or more carrier(s) 240a-n ($P_{SAT}$) may be dimensioned. As power limitation 420 may correspond to the dimensioned satellite power ($P_{SAT}$), said dimensioning may also determine power limitation 420 for the return channel arrangement 200 and/or for bandwidth limitation 410.

In some embodiments, a Demand Assignment Multiple Access (DAMA) approach may be utilized for dimensioning the power needed from a satellite ($P_{SAT}$). For example, the power needed from a satellite (e.g. satellite 110) for return channel arrangement 200 and/or for bandwidth limitation 410 may be dimensioned to be lower than said calculated total sum of power limits corresponding to the one or more carrier(s) 240a-n (e.g. $P_{SAT} < P_{TOT}$). It may be noted that dimensioning the power needed from the satellite (e.g. satellite 110) to be lower than the calculated total sum of power limits corresponding to the one or more carrier(s) 240a-n might not allow all the one or more terminal(s) 140a-n to simultaneously transit at their corresponding maximum power limit(s), as this might result in needing more power from the satellite than the dimensioned power. However, at any given time, one or more terminals of the one or more terminal(s) 140a-n may transmit at their maximum power limit (hence for example transmit their needed maximum data rate) if the other (e.g. remaining) terminals transmit at power levels lower than their corresponding maximum power limits, so that the total power needed from the satellite by all the one or more terminal(s) 140a-n over all the one or more carrier(s) 240a-n may not exceed the dimensioned power. Nevertheless, in order for a DAMA approach to be useful, the limit set by the dimensioned power corresponding to return channel arrangement 200 and/or to bandwidth limitation 410 may have to be enforced in real-time, or substantially in real-time.

A terminal 140 (e.g. 140a) may be configured to receive, for example from hub 120, allocation information, the allocation information corresponding to a channel for transmitting a carrier 240 (e.g. 240a). In some embodiments, the terminal may also be configured to receive, at least upon receiving said allocation information, a maximum power figure for carrier 240, wherein the maximum power figure may be received in an allocation message or in any other message that hub 120 may be configured to send (e.g. over the forward channel) to terminal 140 upon sending said allocation information. In some embodiments, terminal 140 may be further configured to receive a maximum power figure for carrier 240 also one or more times after receiving said allocation information (e.g. as long as the corresponding channel may be still allocated).

In some embodiments, terminal 140 may be configured to interpret a received maximum power figure as a maximum $E_S/N_0$ level at which its transmitted carrier 240 may be received, e.g. at hub 120. In some embodiments, terminal 140 may be further configured to receive, e.g. from hub 120, one or more $E_S/N_0$ measurements for carrier 240 and to regulate the power level at which it transmits carrier 240 at least in accordance with the received one or more $E_S/N_0$ measurements and in accordance with a last received maximum $E_S/N_0$ level for carrier 240. Terminal 140 may be configured to reduce the transmission power level for carrier 240 if the received one or more $E_S/N_0$ measurements is/are higher than the maximum $E_S/N_0$ level corresponding to carrier 240. In some embodiments, terminal 140 may be further configured to change one or more properties of carrier 240, such as but not limited to a modulation property and a forward error correction (FEC) property, in accordance with a modified transmission power level and/or a change or an expected change in received $E_S/N_0$ measurements, for at least the purpose of maintaining Quasi Error Free (QEF) performance.

In some embodiments, terminal 140 may be configured to modify the transmission power of carrier 240 in accordance with at least a data rate characteristic, wherein the transmission power may be modified without interrupting the SCPC carrier signal (e.g. carrier 240) and wherein the maximum transmission power may be regulated in accordance with received one or more $E_S/N_0$ measurements and a last received maximum $E_S/N_0$ level for carrier 240. Thus, terminal 140 may transmit at less than the maximum power allowed for carrier 240, for example at times when the data rate to be transmitted may be supported by a MODCOD that may be used with less than said maximum power allowed while maintaining QEF performance.

Hub 120 may be configured to determine a maximum power for a carrier 240 (e.g. 240*a*), at least upon allocating a channel to a terminal 140 (e.g. 140*a*) for transmitting carrier 240. Hub 120 may be further configured to inform terminal 140 of the determined maximum power, for example by including the determined maximum power figure in an allocation message or in any other message that hub 120 may send (e.g. over the forward channel) to terminal 140 upon allocating said channel. In some embodiments, said maximum power figure may correspond to a maximum $E_S/N_0$ level at which carrier 240 (e.g. 240*a*) may be received at hub 120. In some embodiments, hub 120 may be further configured to periodically and/or occasionally take one or more $E_S/N_0$ measurement(s) of the one or more carrier(s) 240*a-n* and to provide some or all of these measurements to the one or more terminal(s) 140*a-n*, so that each of the one or more terminal(s) 140*a-n* may receive one or more measurements corresponding to the carrier it transmits (i.e. out of carrier(s) 240*a-n*).

As previously described, power-bandwidth limitation 400 may be characterized by a bandwidth limitation 410 and a power limitation 420, wherein power limitation 420 may correspond to a maximum power level that may be drawn from a satellite (e.g. satellite 110) over said bandwidth limitation 410. In some embodiments, power limitation 420 may be specified as an $E_S/N_0$ characteristic of a carrier occupying the entire bandwidth associated with bandwidth limitation 410, e.g. as such $E_S/N_0$ characteristics may perhaps be measured (e.g. either theoretically or practically) at hub 120. As $E_S/N_0$ may be a characteristic of power spectral density (e.g. power per a unit of bandwidth), multiplying said power limitation 420 by bandwidth limitation 410 may yield a figure corresponding to the maximum power level that may be drawn from a satellite (e.g. satellite 110) over bandwidth limitation 410. A similar principle may be applied to any part of the bandwidth associated with bandwidth limitation 410, for example to the bandwidth of any of the one or more carrier(s) 240*a-n*. For example, a maximum power equivalent for a carrier 240 (e.g. 240*a*) may be calculated as the multiplication of a maximum $E_S/N_0$ level associated with carrier 240 by the bandwidth occupied by carrier 240, wherein the bandwidth occupied by carrier 240 may be directly proportioned to a symbol rate characteristic of carrier 240.

FIG. 5 shows a flow chart of an example algorithm for determining a maximum power for a carrier. In some embodiments, hub 120 may be configured to determine a maximum power for a carrier 240 at least in accordance with power-bandwidth limitation 400 (e.g. corresponding to return channel arrangement 200), $E_S/N_0$ measurement(s) of one or more carrier(s) 240*a-n* (e.g. measurements which hub 120 may be configured to periodically and/or occasionally collect), and a maximum data rate that a terminal 140 may need to transmit over carrier 240.

Initially, as long as there may be sufficient power available under power-bandwidth limitation 400, hub 120 may be configured to determine a maximum power for a carrier 240 in accordance with a maximum data rate that a terminal 140 may need to transmit over carrier 240. For example, hub 120 may be configured to determine a maximum $E_S/N_0$ level for carrier 240 in accordance with a QEF $E_S/N_0$ level associated with a MODCOD, which in combination with a symbol rate characteristic of carrier 240 may yield a maximum data rate for carrier 240 which may be higher than or equal to the maximum data rate needed, and to calculate said maximum power by multiplying said maximum $E_S/N_0$ level by the bandwidth characteristic associated with carrier 240.

Furthermore, upon determining the maximum power for a carrier 240, e.g. carrier 240*m* (P(m), step 511), hub 120 may be configured to determine whether there is sufficient power under power-bandwidth limitation 400 to support all the already allocated one or more carrier(s) (e.g. 240*a-k*) plus carrier 240*m* (steps 512 and 513). If the total sum of the maximum power figures associated with the one or more carrier(s) 240*a-k* plus the maximum power figure for carrier 240*m* exceeds the total power available under power-bandwidth limitation 400 ((P(a . . . m)>$P_{400}$), hub 120 may be configured to determine whether sufficient power may be freed from the already allocated one or more carrier(s) 240*a-k*, at least for the purpose of allowing allocation of carrier 240*m* without exceeding power-bandwidth limitation 400.

Hub 120 may be configured to determine that a maximum $E_S/N_0$ level associated with at least one of the one or more carrier(s) 240*a-k* may be reduced (e.g. for at least the purpose of freeing power under power-bandwidth limitation 400) if the at least one of the one or more carrier(s) 240*a-k* is received at an $E_S/N_0$ level lower than the maximum $E_S/N_0$ level associated with it (e.g. RX $E_S/N_0$<MAX $E_S/N_0$). In some embodiments, hub 120 may be configured to determine that a maximum $E_S/N_0$ level associated with at least one of the one or more carrier(s) 240*a-k* may be reduced if the at least one of the one or more carrier(s) 240*a-k* is received at an $E_S/N_0$ level lower than the maximum $E_S/N_0$ level associated with it by at least a predefined margin (e.g. RX $E_S/N_0$<MAX $E_S/N_0$—Margin).

Upon determining that maximum $E_S/N_0$ level(s) associated with one or more of the one or more carrier(s) 240*a-k* may be reduced (e.g. for carriers 240*c-f*), hub 120 may be configured to determine temporary maximum $E_S/N_0$ level(s) for said one or more carrier(s) 240*c-f* and corresponding temporary maximum power figures for carrier(s) 240*c-f*. In some embodiments, hub 120 may be configured to determine temporary maximum power figures for all the one or more carrier(s) 240*a-k*, wherein the temporary maximum power figure for carrier for which the maximum power figure may not be reduced may be set in accordance with their current maximum power figures respectively (step 514). Hub 120 may be further configured to recalculate the total sum of the maximum power figures associated with the one or more carrier(s) 240*a-k* plus the maximum power figure for carrier 240*m* using said temporary power figures (e.g. associated with carriers 240*c-f* and/or associated with all the one or more carrier(s) 240*a-k*) and to determine whether the amount of power that may be freed from the already allocated one or more carrier(s) 240*a-k* may be sufficient for allocating carrier 240*m* without exceeding power-bandwidth limitation 400 (step 516). If the amount of power that may be freed may be sufficient for allocating carrier 240*m* without exceeding power-bandwidth limitation 400, hub 120 may be further configured to replace the previous maximum power figures at least for carrier(s) 240*c-f* with said temporary maximum power figures (and in some embodiments for all the one or more carriers 240*a-k*)

(step 517), to inform the one or more terminal(s) 140*c-f*, which may transmit carrier(s) 240*c-f* respectively, of the new maximum $E_S/N_0$ level(s) corresponding to the new maximum power figures (step 518), and to allocate carrier 240*m* in accordance with the maximum $E_S/N_0$ level already determined for it (step 519).

In some embodiments, upon determining that the amount of power that may be freed from the already allocated one or more carrier(s) 240*a-k* may not be sufficient for allocating carrier 240*m* without exceeding power-bandwidth limitation 400, hub 120 may be further configured not to allocate carrier 240*m*, at least until such time that sufficient power for allocating carrier 240*m* may be available under power-bandwidth limitation 400. In some other embodiments, upon said determining, hub 120 may be configured to determine the maximum power for carrier 240*m* as the maximum power remaining under power-bandwidth limitation 400 (either with considering any power that may be freed from the already allocated one or more carrier(s) 240*a-k* (step 521) or without such consideration (step 522)) and to associate carrier 240*m* with a maximum $E_S/N_0$ level in accordance with the determined maximum power level for carrier 240*m*, wherein the determined maximum $E_S/N_0$ level associated with carrier 240*m* may correspond to a MODCOD which in combination with a symbol rate characteristic of carrier 240*m* may support a data rate lower than the maximum data rate needed for carrier 240*m*.

In some embodiments, a terminal 140, e.g. terminal 140*a*, may be configured to determine that a maximum $E_S/N_0$ level currently assigned to it may be too low for supporting a MODCOD that may be needed for transmitting a needed data rate over a carrier 240*a*. Terminal 140*a* may be configured to send a request to hub 120 for allocating or reallocating carrier 240*a* with a higher maximum $E_S/N_0$ level. Hub 120 may be configured to receive a request from a terminal 140, e.g. terminal 140*a*, for allocating or reallocating a carrier 240*a* with a higher maximum $E_S/N_0$ level and to treat it as a request to allocate carrier 240*a* with a maximum power figure corresponding to a requested maximum $E_S/N_0$, wherein a maximum power figure currently associated with carrier 240*a* may be considered as available power under power-bandwidth limitation 400. If sufficient power may be freed for allocating carrier 240*a* with the requested maximum power figure, hub 120 may be configured to use the allocation process as previously described. However, if sufficient power may not be freed for reallocating carrier 240*a*, hub 120 may be configured to reject the request and to leave carrier 240*a* allocated with its previously associated maximum $E_S/N_0$ level.

In some embodiments, said request for carrier reallocation may include a priority indicator, wherein said priority indicator may be either predetermined (e.g. on a terminal basis) or dynamically determined (e.g. in accordance with a class of traffic or an application that a terminal may service at the time of said requesting). In some embodiments, hub 120 may be configured to consider said priority indicator upon allocating or reallocating a carrier 240 (e.g. 240*a*) associated with a terminal 140 (e.g. 140*a* respectively) transmitting such a prioritized request. Hub 120 may be configured to free sufficient power under power-bandwidth limitation 400 for allocating carrier 240*a*, for example by forcefully reducing one or more maximum power figure(s) for one or more of the one or more carrier(s) 240*b-n* which may be associated with a lower and perhaps also similar priority as terminal 140*a*, and to allocate or reallocate carrier 240*a* in accordance with the process previously described.

In some embodiments, either occasionally and/or periodically and/or upon failing to allocate or reallocate a carrier 240 (for example due to lack of power under power-bandwidth limitation 400), hub 120 may be configured to determine whether the space segment corresponding to power-bandwidth limitation 400 may be utilized in a balanced manner between power and bandwidth. Hub 120 may be configured to calculate a power over bandwidth ratio (P/B) for said space segment and to determine whether the P/B ratio is higher than a predefined value. If the P/B ratio is higher than the predefined value, hub 120 may be configured to reallocate one or more of the one or more carrier(s) 240*a-n* using either higher or lower symbol rate characteristic and/or either lower or higher maximum $E_S/N_0$ level, so that each of these one or more of the one or more carrier(s) 240*a-n* may support a similar data rate as it may have supported prior to the reallocation.

While the above disclosure may suggest use of an $E_S/N_0$ characteristic for any number of purposes (for example, characterizing a QEF level of a MODCOD, measuring a received level of a carrier, etc.), it is suggested that the disclosed aspects may be adapted to use other appropriate signal-to-noise characteristics without departing from the above disclosure.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

We claim:

1. A terminal configured to:
   receive, from a hub within a satellite communication system, allocation information corresponding to a channel for transmitting a carrier;
   receive, from the hub, a maximum reception level at which the carrier is allowed to be received at the hub;
   receive, from the hub, one or more reception level measurements corresponding to the carrier;

compare the maximum reception level at which the carrier is allowed to be received at the hub to at least one of the one or more reception level measurements corresponding to the carrier; and regulate a power level at which the terminal transmits the carrier at least in accordance with the comparison and a data rate of data to be transmitted by the terminal.

2. The terminal of claim 1, wherein the terminal is further configured to:

reduce the power level at which the terminal transmits the carrier if the received one or more reception level measurements are higher than the maximum reception level corresponding to the carrier; and change at least a modulation and coding combination (MODCOD) property of the carrier in accordance with at least one of a modified transmission power level or a change in received reception level measurements.

3. The terminal of claim 1, wherein the terminal is further configured to:

determine that a maximum reception level currently assigned to the carrier is too low for supporting a MODCOD needed for transmitting a target data rate; and send a request, to the hub, for allocating a higher maximum reception level to the carrier.

4. The terminal of claim 1, wherein the terminal is further configured to:

determine the data rate for the data to be transmitted by the terminal;

determine a first modulation and coding combination (MODCOD) and a first maximum data rate corresponding to the first MODCOD, wherein the first MODCOD is a MODCOD used by the terminal at a time of a determination of the first MODCOD; and determine that the determined data rate is greater than the first maximum data rate.

5. The terminal of claim 4, wherein the terminal is further configured to:

select a second MODCOD associated with a second maximum data rate, wherein the second maximum data rate is greater than the first maximum data rate; and modify transmission power associated with the terminal, wherein modifying the transmission power comprises increasing the transmission power in accordance with at least a quasi-error-free (QEF) reception level associated with the second MODCOD.

6. The terminal of claim 5, wherein the terminal is further configured to:

receive one or more reception level indications from a receiver that receives the carrier; and determine whether the carrier is received at a sufficient reception level in accordance with the one or more reception level indications and in accordance with the QEF reception level associated with the second MODCOD.

7. The terminal of claim 6, wherein the terminal is further configured to:

transmit the carrier using the second MODCOD if the carrier is received at a sufficient reception level in accordance with the QEF reception level associated with the second MODCOD.

8. The terminal of claim 7, wherein the terminal is further configured to:

determine that the determined data rate is less than the first maximum data rate;

select a third MODCOD associated with a third maximum data rate, wherein the third MODCOD is different from the first MODCOD and wherein the third maximum data rate is less than the first maximum data rate and greater than or equal to the determined data rate;

transmit the carrier using the third MODCOD;

modify the transmission power of the terminal, wherein modifying the transmission power comprises decreasing the transmission power in accordance with at least a QEF reception level associated with the third MODCOD; and verify that the carrier is received at an appropriate reception level at least in accordance with the QEF reception level associated with the third MODCOD.

9. A satellite communication system, comprising the terminal of claim 1.

10. A method comprising:

receiving, by a terminal from a hub within a satellite communication system, allocation information corresponding to a channel for transmitting a carrier;

receiving, by the terminal from the hub, a maximum reception level at which the carrier is allowed to be received at the hub;

receiving, by the terminal from the hub, one or more reception level measurements corresponding to the carrier;

comparing, by the terminal, the maximum reception level at which the carrier is allowed to be received at the hub to at least one of the one or more reception level measurements corresponding to the carrier; and regulating, by the terminal, a power level at which the terminal transmits the carrier at least in accordance with the comparison and a data rate of data to be transmitted by the terminal.

11. The method of claim 10, wherein the regulating comprises reducing the power level at which the terminal transmits the carrier if the received one or more reception level measurements are higher than the maximum reception level corresponding to the carrier, the method further comprising:

changing at least a modulation and coding combination (MODCOD) property of the carrier in accordance with at least one of a modified transmission power level or a change in received reception level measurements.

12. The method of claim 10, further comprising:

determining that a maximum reception level currently assigned to the carrier is too low for supporting a MODCOD needed for transmitting a target data rate; and sending a request, from the terminal to the hub, for allocating a higher maximum reception level to the carrier.

13. The method of claim 10, further comprising:

determining the data rate for the data to be transmitted by the terminal;

determining a first modulation and coding combination (MODCOD) and a first maximum data rate corresponding to the first MODCOD, wherein the first MODCOD is a MODCOD used by the terminal at a time of the determining of the first MODCOD; and determining that the determined data rate is greater than the first maximum data rate.

14. The method of claim 13, further comprising:

selecting a second MODCOD associated with a second maximum data rate, wherein the second maximum data rate is greater than the first maximum data rate; and modifying transmission power associated with the terminal, wherein the modifying comprises increasing the transmission power in accordance with at least a quasi-error-free (QEF) reception level associated with the second MODCOD.

15. The method of claim 14, further comprising:
receiving one or more reception level indications from a receiver that receives the carrier; and
determining whether the carrier is received at a sufficient reception level in accordance with the one or more reception level indications and in accordance with the QEF reception level associated with the second MODCOD.

16. The method of claim 15, further comprising:
transmitting the carrier using the second MODCOD if the carrier is received at a sufficient reception level in accordance with the QEF reception level associated with the second MODCOD.

17. The method of claim 16, further comprising:
determining that the determined data rate is less than the first maximum data rate;
selecting a third MODCOD associated with a third maximum data rate, wherein the third MODCOD is different from the first MODCOD and wherein the third maximum data rate is less than the first maximum data rate and greater than or equal to the determined data rate;
transmitting the carrier using the third MODCOD;
modifying the transmission power of the terminal, wherein the modifying comprises decreasing the transmission power in accordance with at least a QEF reception level associated with the third MODCOD; and
verifying that the carrier is received at an appropriate reception level at least in accordance with the QEF reception level associated with the third MODCOD.

18. A method comprising:
determining, by a terminal of a satellite communication system, a data rate for data to be transmitted;
in response to the determining the data rate, determining a first modulation and coding combination (MODCOD) for transmitting a carrier and determining a first maximum data rate for transmitting the data over the carrier using the first MODCOD;
comparing the data rate with the first maximum data rate;
in response to determining that the data rate is greater than the first maximum data rate, selecting a second MODCOD that supports a second maximum data rate for transmitting the data over the carrier; and
in response to selecting the second MODCOD:
increasing a transmission power of the terminal in accordance with at least a quasi-error-free (QEF) normalized symbol energy over noise ($E_S/N_0$) level associated with the second MODCOD;
receiving a reception level indication; and
determining whether the indicated reception level satisfies a threshold $E_S/N_0$ level associated with the second MODCOD.

19. The method of claim 18, wherein the receiving the reception level indication comprises receiving the reception level indication from a hub of the satellite communication system.

20. The method of claim 18, further comprising:
in response to determining that the indicated reception level does not satisfy a threshold $E_S/N_0$ level associated with the second MODCOD, determining whether additional transmission power is available;
in response to determining that additional transmission power is available, further increasing the transmission power of the terminal;
in response to the further increasing the transmission power of the terminal, selecting an intermediate MODCOD in accordance with the reception level indication, wherein the intermediate MODCOD is different from both the first MODCOD and the second MODCOD and wherein the intermediate MODCOD is associated with a QEF $E_S/N_0$ level that is higher than a QEF $E_S/N_0$ level associated with the first MODCOD but lower than or equal to the QEF $E_S/N_0$ level associated with the second MODCOD; and
transmitting the carrier in accordance with the intermediate MODCOD before the transmission power, for supporting the second MODCOD, is stabilized.

* * * * *